United States Patent [19]

Bill

[11] Patent Number: 5,795,101
[45] Date of Patent: Aug. 18, 1998

[54] PIPE LAYING ROBOT APPARATUS AND METHOD FOR INSTALLING PIPE

[76] Inventor: Frank N. Bill, 4737 S. 107th, Seattle, Wash. 98178

[21] Appl. No.: 686,859

[22] Filed: Jul. 26, 1996

[51] Int. Cl.$^6$ .................................................. F16L 1/00
[52] U.S. Cl. ........................ 405/154; 294/81.4; 294/86.41
[58] Field of Search .................................. 405/154, 157, 405/159, 174, 175; 294/86.41, 68.23, 81.3, 81.4, 67.5; 414/745.4, 746.8, 729, 739, DIG. 12

[56] References Cited

U.S. PATENT DOCUMENTS

| 3,561,615 | 2/1971 | Forsberg | 414/745.4 X |
|---|---|---|---|
| 3,657,786 | 4/1972 | Wiswell, Jr. | 414/745.4 X |
| 4,362,435 | 12/1982 | Henry | 405/179 X |
| 4,451,194 | 5/1984 | Keats et al. | 294/86.41 X |
| 5,219,265 | 6/1993 | Recker | 294/86.41 X |
| 5,368,413 | 11/1994 | Moore | 405/154 |

FOREIGN PATENT DOCUMENTS

| 1139813 | 2/1985 | U.S.S.R. | 414/745.4 |
|---|---|---|---|
| 2027781 | 2/1980 | United Kingdom | 414/745.4 |

*Primary Examiner*—Tamara L. Graysay
*Assistant Examiner*—Frederick L. Lagman
*Attorney, Agent, or Firm*—R. Reams Goodloe, Jr.

[57] ABSTRACT

A pipe laying robot for manipulating an elongated workpiece such as a pipe section. The robot is a grasping apparatus particularly adapted for placing pipe in a trench. The apparatus is designed to be suspended from a lifting device such as a backhoe, and is adapted to grasp and manipulate the workpiece for lifting, moving, or setting the workpiece. The apparatus has a first frame, and a second frame rotatably secured to the first frame for angular rotation of the second frame about a normally vertical axis of rotation with respect to the first frame. Two or more grapplers are connected to the second frame in opposing juxtaposition and are moveable between (i) an open position wherein the grasping apparatus is lowered to a position so the the grapplers straddle the workpiece, and (ii) a closed position wherein the grapplers engage and securely grasp the workpiece. A pitch actuator is provided to displace the second frame with respect to the first frame in an up or down pitching movement to thereby pitch the elongated workpiece up or down as desired. A linear displacement actuator is provided to displace the second frame with respect to the first frame and thereby displace the elongated workpiece in a linear direction substantially along its centerline. An efficient method for laying underground pipelines, such as sewer, gas pipe, or water pipelines, via use of the pipe laying robot, is also disclosed.

18 Claims, 14 Drawing Sheets

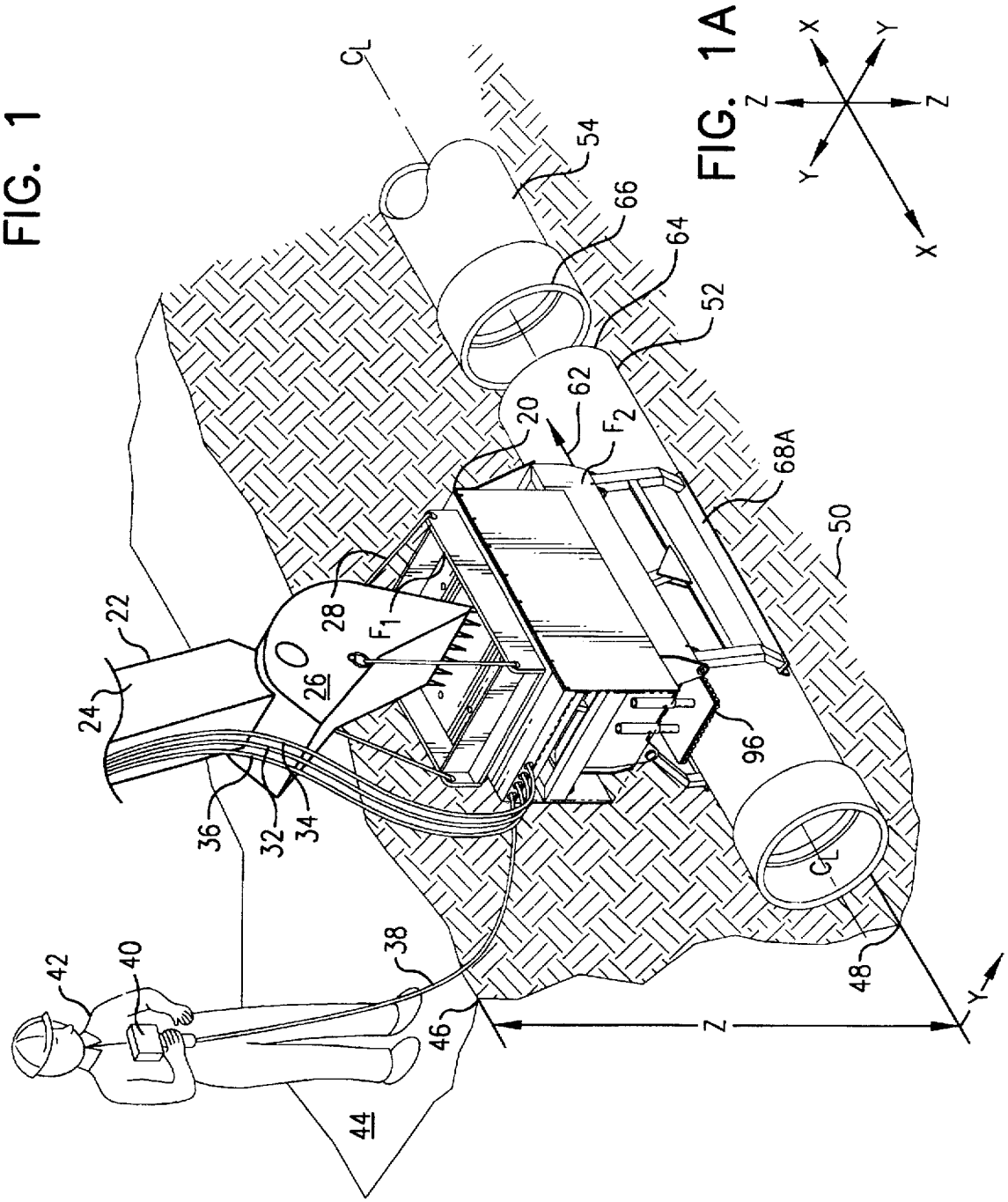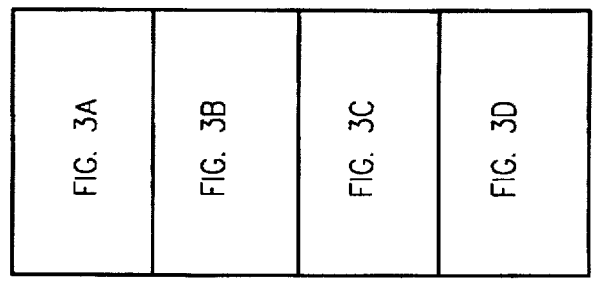

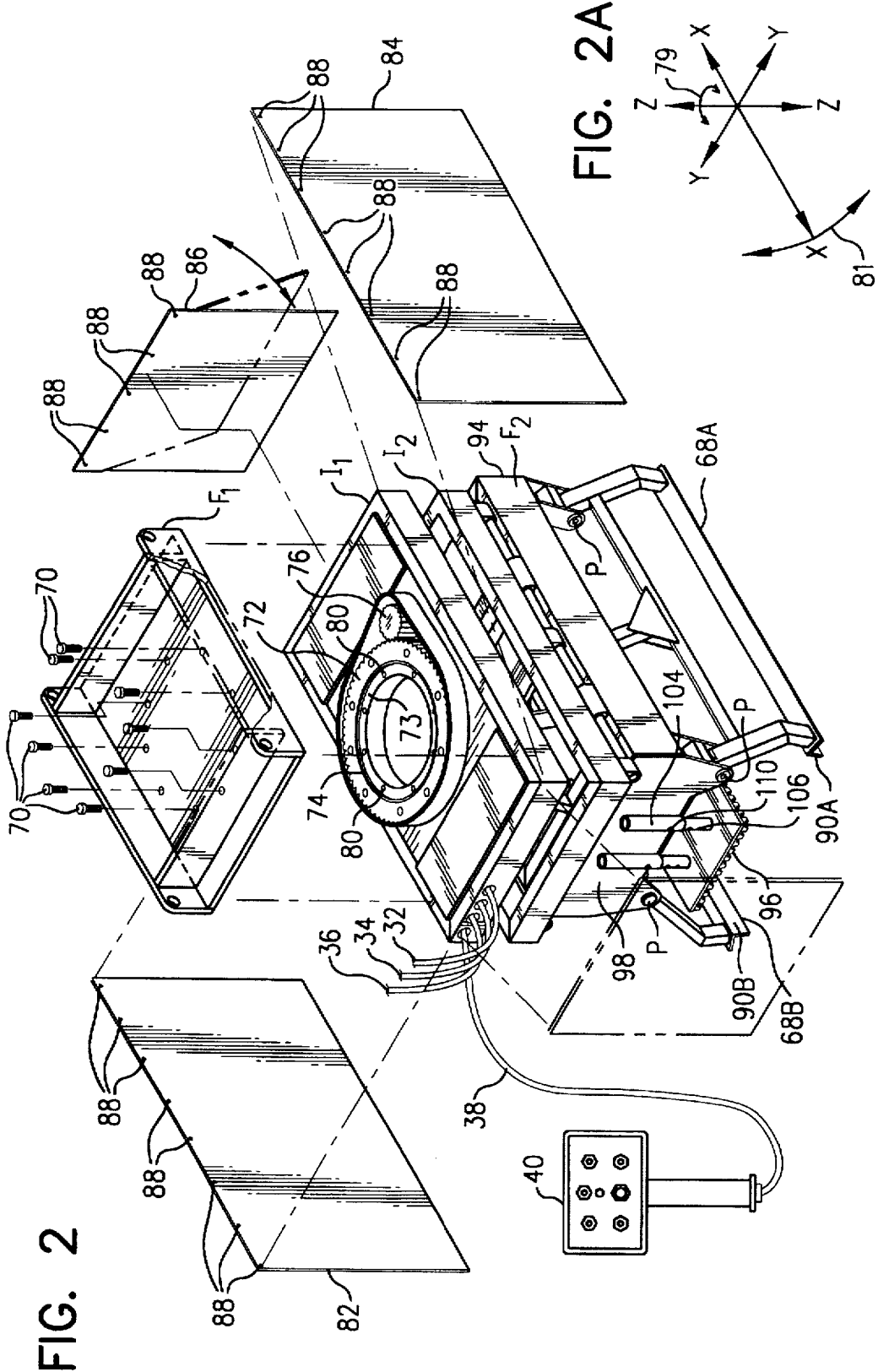

PIPE LAYING ROBOT APPARATUS AND METHOD FOR INSTALLING PIPE

TECHNICAL FIELD OF THE INVENTION

This invention relates to a method and apparatus for the installation of pipe. More specifically, disclosed and claimed herein is a method for simply and easily laying and connecting pipe in trenches, and an apparatus for quickly and inexpensively carrying out the pipe laying method. A primary use of the invention is for the setting of pipe in below grade trenches.

BACKGROUND OF THE INVENTION

A wide variety of methods and apparatus are known for handling pipe, and more particularly, for handling pipe to be laid down in a below grade location. Operational requirements in below grade trenches have become highly regulated by state and federal safety authorities such as the Occupational Health and Safety Administration, and as a result, increasingly costly techniques have become commonplace. Typically, such techniques involve the use of "trench boxes" to protect workers in a trench against the dangers of collapse of trench walls. As a result, to lay below grade pipe runs such as plastic sewer pipe, gas mains, water mains, or similar pipelines, considerable time is consumed to set and to remove trench boxes along the working face of the pipe run. Also, such techniquest require substantial capital investment and in most cases, documentation of design and inspection criteria. Quite simply, the necessary techniques increase both the cost and the time for completion of below grade pipe laying contracts.

From the foregoing, it is clear that there is a continuing need for a simple, low cost, quickly executable pipe laying method and for the apparatus to enable semi-skilled or unskilled personnel to safely, confidently, accurately, and reliably carry out the installation of below grade piping, without the necessity to place personnel into the trench.

THE PRIOR ART

Apparatus for laying pipe which may have some features superficially resembling those disclosed herein to some remote extent include those disclosed in the following U.S. Pat. No. : 3,207,326 issued Sep. 21, 1965 to Enix for PIPE HANDLING DEVICE, and U.S. Pat. No. 4,266,910 issued May 12, 1981 to Pickard for PIPE POSITIONER BOOM AND HEAD ASSEMBLY FOR PIPE LAYING FRAME.

Enix shows the use of a pipe handling device which may be suspended from a backhoe boom to secure a pipe. The device has anchor shoes for gripping the walls of the trench in which pipe is being placed, to enable the device to linearly move a pipe section a small distance via action of a hydraulic cylinder. No provision is made for pitch motion. Moreover, yaw motion can only be provided to a very limited extent via asymmetrical positioning of the anchor shoes. In applications like those of concern to me, the lack of pitch and the lack of ability of provide for a significant yaw motion are significant drawbacks.

Pickard utilizes an elongated, telescoping boom which is extensible from a turntable mounted on a support vehicle. At the end of a boom, a pair of jaws are mounted, one of which is fixed and one of which is adjustable. Pickard has no provision for linear translation of the pipe section, as it provides a twisting action. More specifically, the device is designed to unload pipe from a vehicle and lay it down alongside of an open trench, rather than for placement of pipe in a trench.

It is significant that none of the prior art devices known to me are concerned with the specific problem of providing a simple, low cost apparatus and method for the quick, remote manipulation of pipe during placement into an unmanned trench. This problem is of significant interest to a wide variety of underground piping contractors. Nor do most of the the prior art devices eliminate the necessity for placing workmen into a trench for final assembly of just laid pipe sections to an ongoing pipe run. As a result, they do not eliminate the necessity for protective trench box or like devices, and the concomitant expense. Thus, a continuing need exists for a simple pipe laying apparatus which can provide an adequate range of motion, at a high productivity rate (and thus at lower cost), in the laying of secure, fully fitted pipelines.

SUMMARY OF THE INVENTION

I have developed a pipe laying device for placing pipe sections into a working location, and in particular for placing pipe sections in trenches to complete below grade pipeline runs. My novel device is fundamentally a pipe grasping apparatus adapted for grasping pipe sections, in order to enable the pipe section to be lifted, moved, set, and secured in place in a pipeline run under construction. The pipe grasping apparatus is attached to a selected lifting device, preferably a piece of mobile equipment, such as a track hoe or back hoe. The pipe grasping apparatus is connected to the lifting device in a manner that the grasping apparatus can be positioned in a preselected location by the lifting device for further manipulation of the pipe section by the pipe grasping apparatus. The pipe grasping apparatus has a first frame which is secured by connecting devices to the lifting device. A second frame is rotatably connected to the first frame at a rotator which is adapted to angularly rotate said the frame about a normally vertical axis of rotation with respect to the first frame. Two or more pipe grapplers are connected to the second frame in opposing juxtaposition, and are moveable between (i) an open position wherein the grasping apparatus is lowered by the lifting device to position where the two or more grapplers straddle the pipe section, and (ii) a closed position wherein said the two or more grapplers engage and securely grasp the pipe section. A linear displacement actuator is adapted to displace the second frame with respect to the first frame, and thereby displace the pipe section in a linear direction along its longitudinal axis. A pitch actuator displaces the second frame with respect to the first frame in an up or down pitching movement, and thereby move the pipe section to a pitch up or pitch down orientation. Preferably, the two or more grapplers are connected in opposing juxtaposition to the second frame for movement in an inward-outward arcuate path. More preferably, each of the two or more grapplers is configured with an elongate, normally horizontally running clamping surface.

Also, my novel apparatus preferably provided with a vibrator which is operatively connected to the second frame and adapted to generate a vibratory motion to shake the second frame and impart a vibratory motion to the two or more grapplers, and thence to the pipe section, so as to provide a vibrating motion to the pipe section, and to thereby enable settling of a selected substrate placed thereunder. Preferably, the vibrator is a hydraulically driven vibratory motor.

More generally, power is provided by a remote fluid power system, namely a high pressure hydraulic pump, which supplies high pressure hydraulic fluid to provide motive force to the actuators described above, which are thus preferably provided in the form of hydraulic cylinders.

Also, the rotator is preferably provided in a hydraulically powered motor gear drive configuration. Low pressure hydraulic fluid is returned to the hydraulic pump in a conventional manner.

In a preferred configuration, the grasping apparatus is provided with one or more intermediate frames between the first frame and the second frame, for the purpose of isolating one type of movement with respect to the interface between adjacent frames. For example, a first intermediate frame $I_1$ may be rotatingly suspended from the first frame $F_1$, so that the first intermediate frame $I_1$ is angularly adjustable about a normally vertical axis of rotation with respect to the first frame $F_1$. Then, a second intermediate frame $I_2$, may be suspended from and be displaceable in pitch with respect to the first intermediate frame $I_2$. Subsequently, the second frame $F_2$, can then be suspended from the second intermediate frame $I_2$, and be linearly displaceable with respect the second intermediate frame $I_2$.

My solution to providing a simple, pipe grasping and manipulation device involves the use of lightweight gripping apparatus which is supported by a transportable lifting device such as a back hoe or track hoe. The grasping apparatus thus provided, and the various components therein, are reduced in my design to the major, essential components, which can be manufactured with a minimum of cost and expense.

In contrast to pipe laying apparatus and methods that have heretofore been commercially available, the novel apparatus and methods disclosed herein are adaptable to an easily transportable, rapidly executable, and safe pipe laying method. This apparatus and method is suitable for use by semi-skilled workmen, with resultant low installation cost per lineal unit of pipe. The apparatus of the present invention is uniquely adapted to be utilized in a variety of construction applications, including some of which have heretofore been difficult to safely execute, such as pipeline construction in unsupported trenches. Further, the compact apparatus of the present invention allows the pipe laying method to be readily utilized at and be readily moved to and from remote jobsites.

By way of the present invention, I have developed a novel solution to the problem of low productivity in heretofore used methods for laying pipe in below grade trenches. The novel apparatus used in my pipe laying method enables high speed, high productivity operations without the necessity of placing personnel in trenches, and thus, as terrain allows, avoid the necessity of placing trench boxes along a stretch of trench which is being worked.

In short, I have developed a novel method and apparatus for laying any type of underground pipe. My novel pipe laying apparatus includes a unique multi-frame design which provides for (a) angular or yaw motion, (b) pitch motion, and (c) linear displacement. The apparatus greatly simplifies the steps necessary for safely installing pipe in a ditch. In addition, my method accomplishes the pipe laying process without the need for the expensive purchase or fabrication, and time consuming use, of trench box equipment.

OBJECTS, FEATURES, AND ADVANTAGES OF THE INVENTION

It is an object of the present invention to provide a pipe laying apparatus whereby much of the equipment normally associated with running below grade pipe runs, such as trench boxes, can be eliminated to the extent that terrain allows, i.e., when the ground is self supporting.

It is also an object of the present invention to provide a pipe laying apparatus which is simple and inexpensive to manufacture.

It is yet another object of the present invention to provide a device which is light and portable so that laying of pipe can be easily performed wherever desired.

It is still another object of the present invention to provide a device and method which is easy for semi-skilled workers to utilize for the purpose of precisely laying pipe in desired locations, and for easily joining such pipe to previously laid pipe sections, and to a tolerance with respect to slope and leakage that do not exceed the maximum allowable deviation from a particular set of specifications, such as may be established by a regulatory or other quality control requirements.

It is an important feature of the method of the present invention that capital equipment costs for trench box equipment are minimized when compared to conventional pipe laying construction techniques.

It is an important and primary feature of the present invention that use of the method eliminates the necessity for personnel to be located in the trench, thus reducing overall job labor costs.

It is an important and primary feature of the present invention that the apparatus is easy and simply operated by construction equipment operators.

It is yet another important advantage that greatly increased pipe laying rates (often stated in terms of lineal feet of pipe laid per day), can be provided at significantly reduced per foot costs, which dramatically decreases the over all job costs for many below grade pipe laying projects.

Additional objects, advantages, and novel features of the invention will be set forth in the detailed description of the invention which follows, or may become apparent to the reader from the appended claims and accompanying drawings, or may be learned by practice of the invention. The objects and advantages of the invention may be realized and attained by means of the instrumentalities and combinations particularly pointed out in the appended claims, or by their equivalents.

BRIEF DESCRIPTION OF THE DRAWINGS

My invention may be more clearly understood by reference to the accompanying drawings thereof, wherein:

FIG. 1 is a perspective view of my novel pipe laying apparatus, shown at work ready to join a pipe section to a another pipe section already in place in a pipeline in a below grade ditch.

FIG. 1A is a key to describe the orientation of parts and direction of movement of the items depicted in FIG. 1.

FIG. 2 shows a partial exploded perspective view of my novel pipe laying apparatus, with the first frame removed to expose a rotational gear used to angularly displace the first frame with respect to the remainder of the apparatus. Also shown are gravel shields and a hand held remote control panel.

FIG. 2A is a key to describe the orientation of parts and direction of movement of the items depicted in FIG. 2.

FIG. 3 shows the relationship of FIGS. 3A, 3B, 3C, and 3D, which respectively, show the first, second, third, and fourth frame sections of my novel pipe laying apparatus.

DETAILED DESCRIPTION OF THE INVENTION

Figure 3A:
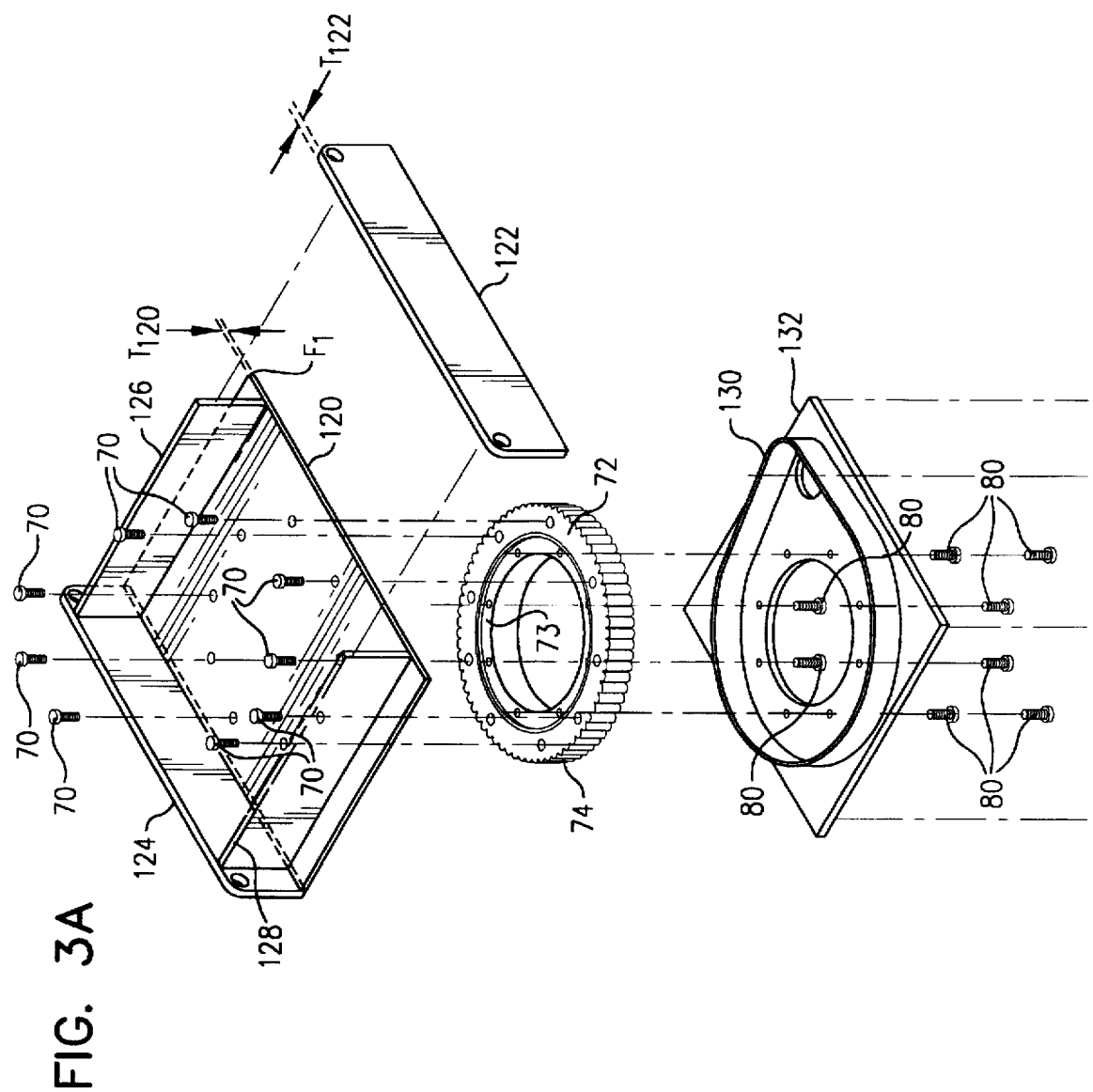
FIG. 3A shows the first or upper frame of my novel pipe laying apparatus, as well as the rotating gear assembly which is used to angularly displace the first frame with respect to the remainder of the apparatus.

My novel pipe grasping apparatus 20, and my method for laying pipe sections, can easily be appreciated by review of FIG. 1. A lifting device 22 (such as boom 24 and bucket 26 of a back hoe, as shown, or other convenient mobile equipment such as a track hoe), used to suspend my pipe grasping apparatus 20 therefrom. Suspension may be accomplished by convenient cables 28 or alternate devices such as hooks and chains 28' (see FIG. 10 below). In any event, a first frame $F_1$ of apparatus 20 is joined in a secure, stable, suspended working arrangement to lifting device 22. Also, the lifting device 22 is used to safely locate utility lines running to the grasping apparatus 20, namely (a) a high pressure hydraulic fluid supply line 32, (b) a low pressure hydraulic fluid return line 34, and (c) an electrical power supply cable 36. Ideally, fluid hydraulic power is supplied in a conventional fashion by a high pressure pump (not shown) in or near the selected lifting device 20 or other selected mobile construction equipment. A control power cable 38 runs from grasping apparatus 20 to a hand held remote controller device 40, which is held by workman 42. The workman 42 stands on the ground 44 safely above grade level 46, rather than at the bottom 48 of trench 50.

The lifting device 22 positions the grasping apparatus 20 to a preselected location in the trench 50, i.e., to a position with respect to the vertical or Z axis, to a position with respect to the transverse or Y axis, and position with respect to the longitudinal or X axis of the trench 50, all as may be better identified with use of the key shown in FIG. 1A. Ideally, the grasping apparatus 20 is moved to a preselected location where a pipe section 52 being grasped is fittingly close (with respect longitudinal or X direction movement provided by grasping apparatus 20, further described hereinbelow) to an existing final pipe section 54 of a pipeline under construction. Once in a preselected location, the lower or second frame 60 is translated longitudinally rearward in the direction of reference numeral 62, so that the male end 64 of pipe section 52 may be inserted into female end 66 of pipe section 54 to be interfittingly positioned for sealing engagement therewith. During this interfitting process, the upper or first frame $F_1$ of grasping apparatus 20 is preferably maintained in a stable, stationary position. After pipe section 52 has been fitted up to pipe section 54, the pipe grapplers 68A and 68B are disengaged from pipe section 52, and the entire grasping apparatus 20 may be raised by lifting device 22 out of the trench 50. Then, a new pipe section 52' (see FIG. 10 below) can be straddled (similar to the position indicated in FIG. 10 below, but generally not in a trench) and then closed to engage and securely grasp a new pipe section 52'. As again can be appreciated from perusal of FIG. 1, the obvious advantage of using my pipe grasping apparatus is that the laying and joining of pipe sections one to the other no longer requires that workmen 40 be located in a trench 50.

Figure 9:
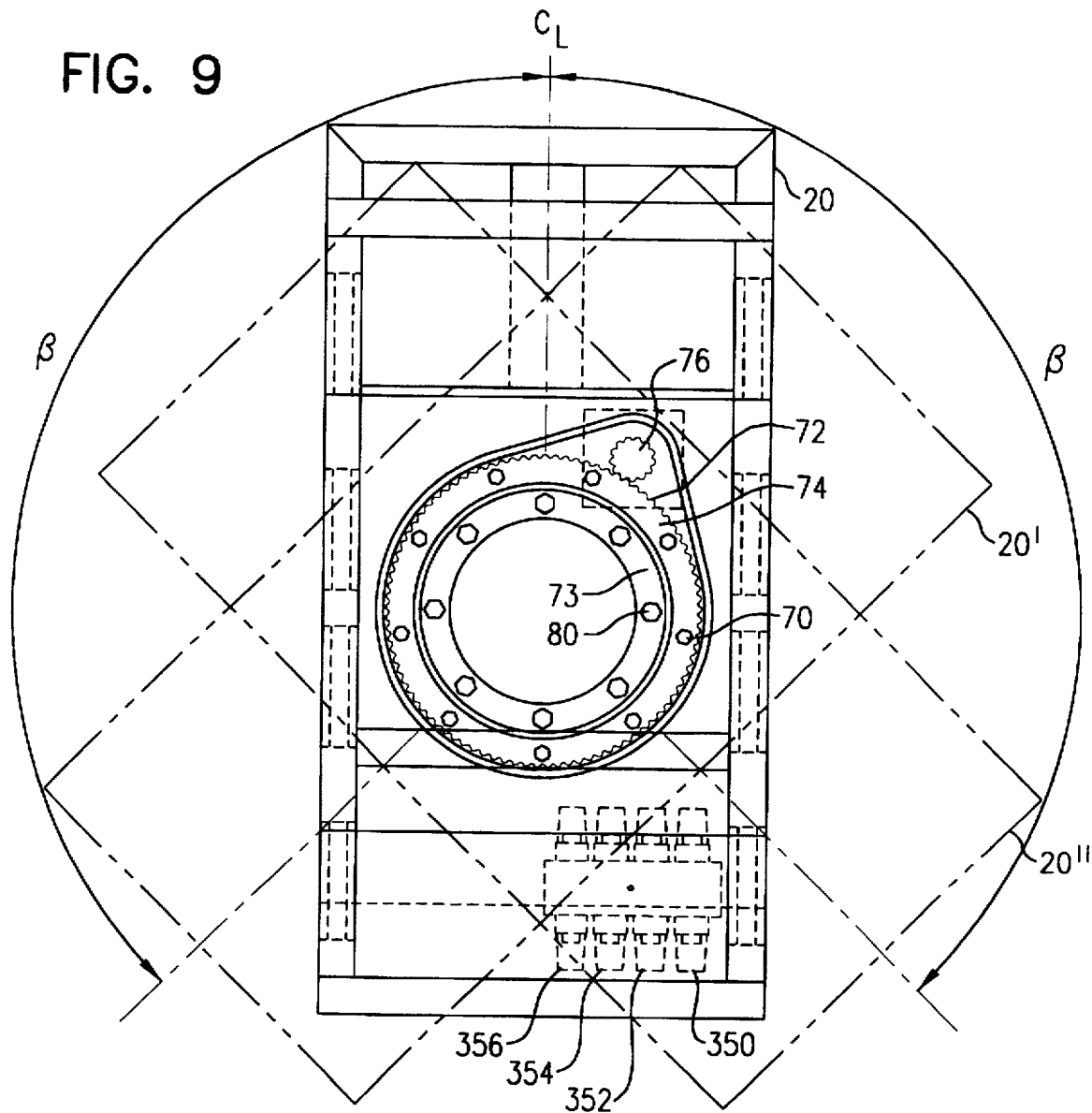
FIGS. 9 shows the rotational movement which is enabled in my pipe laying device.

Attention is now directed to FIG. 2, where a partial exploded perspective view of my novel pipe grasping apparatus 20 is illustrated. First frame $F_1$ is rotatingly mounted from a first intermediate frame $I_1$ via use of bolts or other fasteners 70 of appropriate strength to securely engage rotatable rim portion 72 of gear 74. I have found it advantageous to use a ROTEC type gear for gear 74. The ROTEC brand gear 74 or equivalent preferably uses a combination radial and thrust bearing which enables substantial loads to be suspended between the rim portion 72 and inner ring 73. Gear 74 is affixed to the first intermediate frame $I_1$ and is driven by a pinion 76 that is preferably powered by a hydraulic motor 78 (see FIG. 3B below). Thus, the first intermediate frame $I_1$ is angularly adjustable with respect to the first frame $F_1$ about a normally vertical axis of rotation Z (see reference numeral 79 in FIG. 2A). As can be seen in FIG. 9 below, the gear 74 provides angular rotation up to about 135° in either direction from the resting or aligned position between first frame $F_1$ and first intermediate frame $I_1$. The gear 74, fasteners 70, and similar fasteners 80 affixing the gear 74 to first interconnecting frame $I_1$ must be selected of sufficient strength to carry the load of a desired pipe section, as well as an appreciable portion of the weight of grasping apparatus 20.

A second intermediate frame $I_2$ is pivotally mounted between the first intermediate frame $I_1$ and the second frame $F_2$ in a manner which allows a pitching action (see reference numeral 81 in FIG. 2A) to be imparted therebetween.

Finally, the second frame $F_2$ is slidingly mounted to the second intermediate frame $I_2$ in a fashion which allows the second frame $F_2$ to be displaced linearly along the X-axis as depicted in the reference key shown in FIG. 2A.

Side shields, including left shield 82, right shield 84, front shield 86, and back shield 87 are provided in flexible, wear resistant material in order to protect the grasping apparatus 20 from damage due to abrasive or interfering action of gravel particles which may be placed in the trench 50 to backfill under or along side of a pipeline being constructed. Preferably, such shields 82, 84, 86, and 87 are provided in a flexible, thick, rubber or plastic pad material in a generally parallelepiped shape. Each of shields 82, 84, 86, and 87 are affixed to their respective side of the first intermediate frame $I_1$ via a row of fasteners 88.

For grasping elongated objects such as pipe sections, grapplers 68A and 68B are provided. Grapplers 68A and 68B are provided pivotally mounted at pivot pins P from second frame $F_2$ in opposing juxtaposition. Grapplers 68A and 68B should extend below second frame $F_2$ a sufficient distance to preferably enable an elongated gripping portion 90A and 90B of grapplers 68A and 68B, respectively, to extend somewhat below the centerline of a selected pipe section which is to be grasped. See, for example, $C_1'$ in FIG. 10 below. As a result, grapplers 68A and 68B can be moved in an arcuate, inward-outward, somewhat clam-shell type motion to grasp a selected pipe section.

Figure 10:
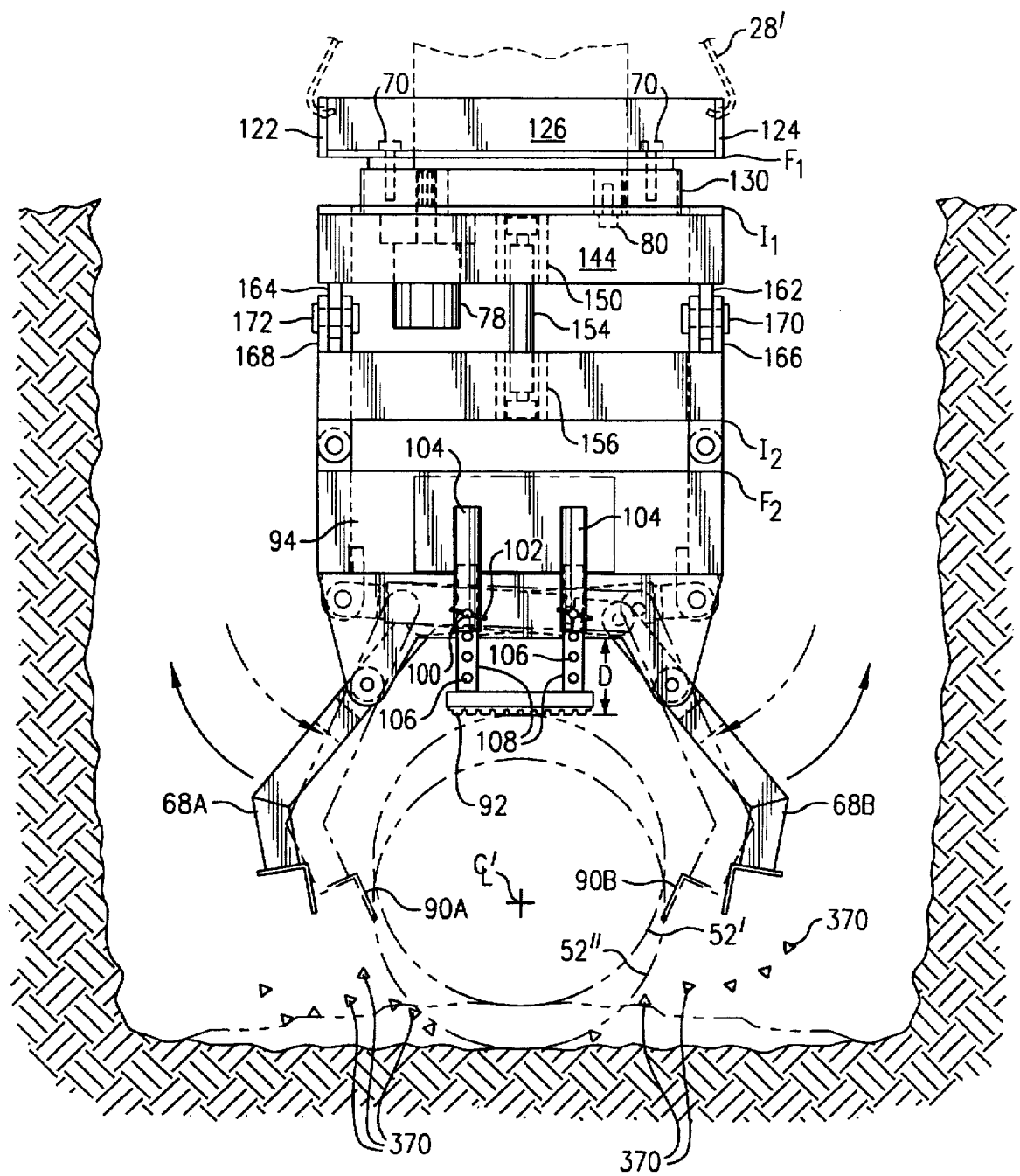
FIG. 10 shows my pipe laying device as if laying pipe in a below grade trench.
Figure 11:
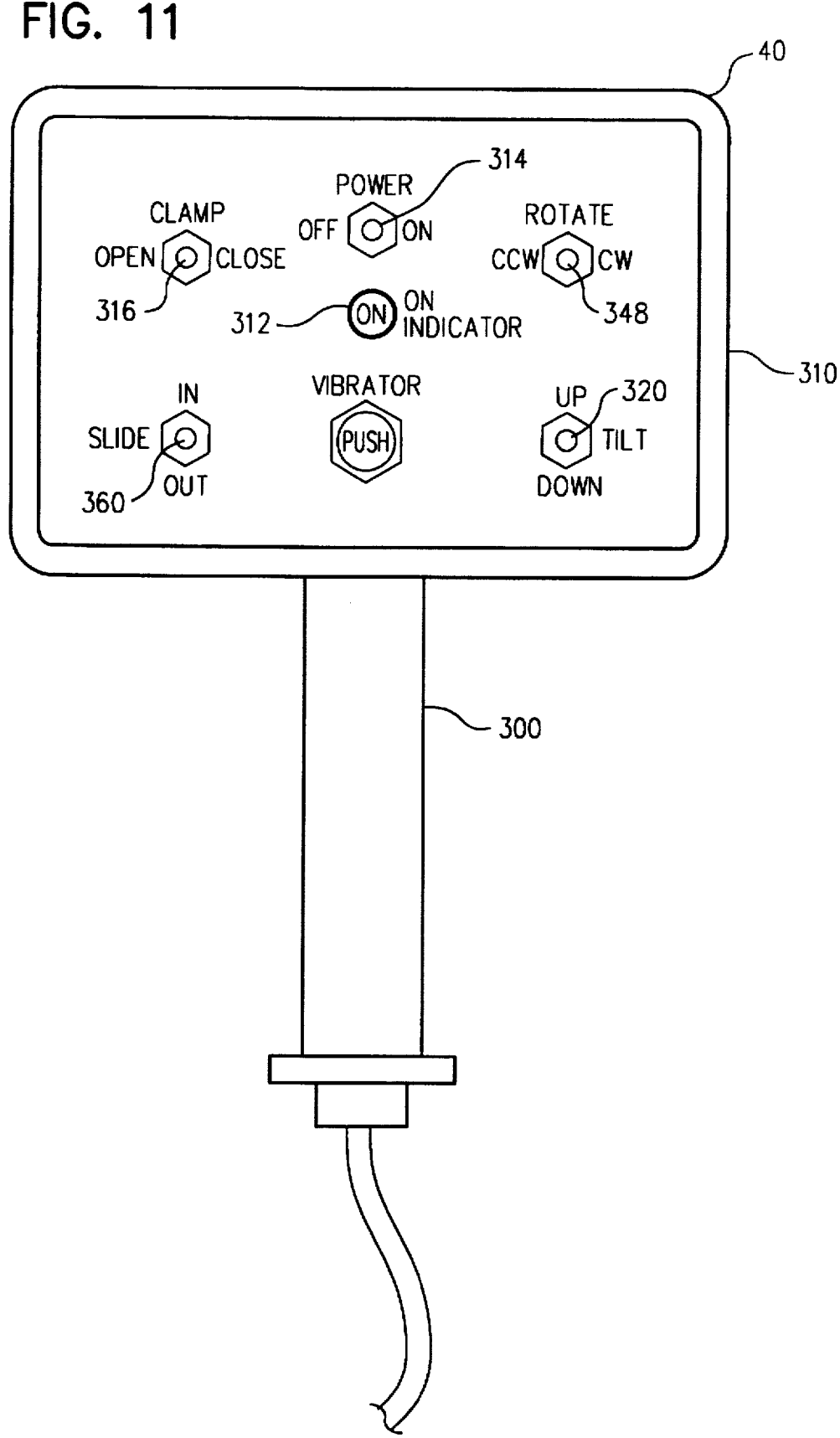
FIG. 11 illustrates the functions provided in the hand held remote control device used in my pipe grasping apparatus.

As seen in FIG. 10 and FIG. 2, for securely positioning a selected pipe section 52', positioning pads 92 are extend downward from the front end 94 of second frame $F_2$ of grasping apparatus 20, and positioning pads 96 extend downward from the rear end 98 of second frame $F_2$ of grasping apparatus 20. Preferably, each of positioning pads 92 and 96 are adjustably secured via stop shaft 100 and locking pin 102 in a slidably interfitting tubular adjustment mechanism 104. Most preferably, a plurality of stop apertures 106 in a first member 108 of slidably interfitting tubular adjustment mechanism 104 are adapted to receive stop shafts 100; a locking aperture 110 in the complementary portion 112 of slidably interfitting tubular adjustment mechanism 104 allows the positioning pads 92 to be securely locked in place a desired distance D below the bottom 114 of second frame $F_2$.

Figure 3B:
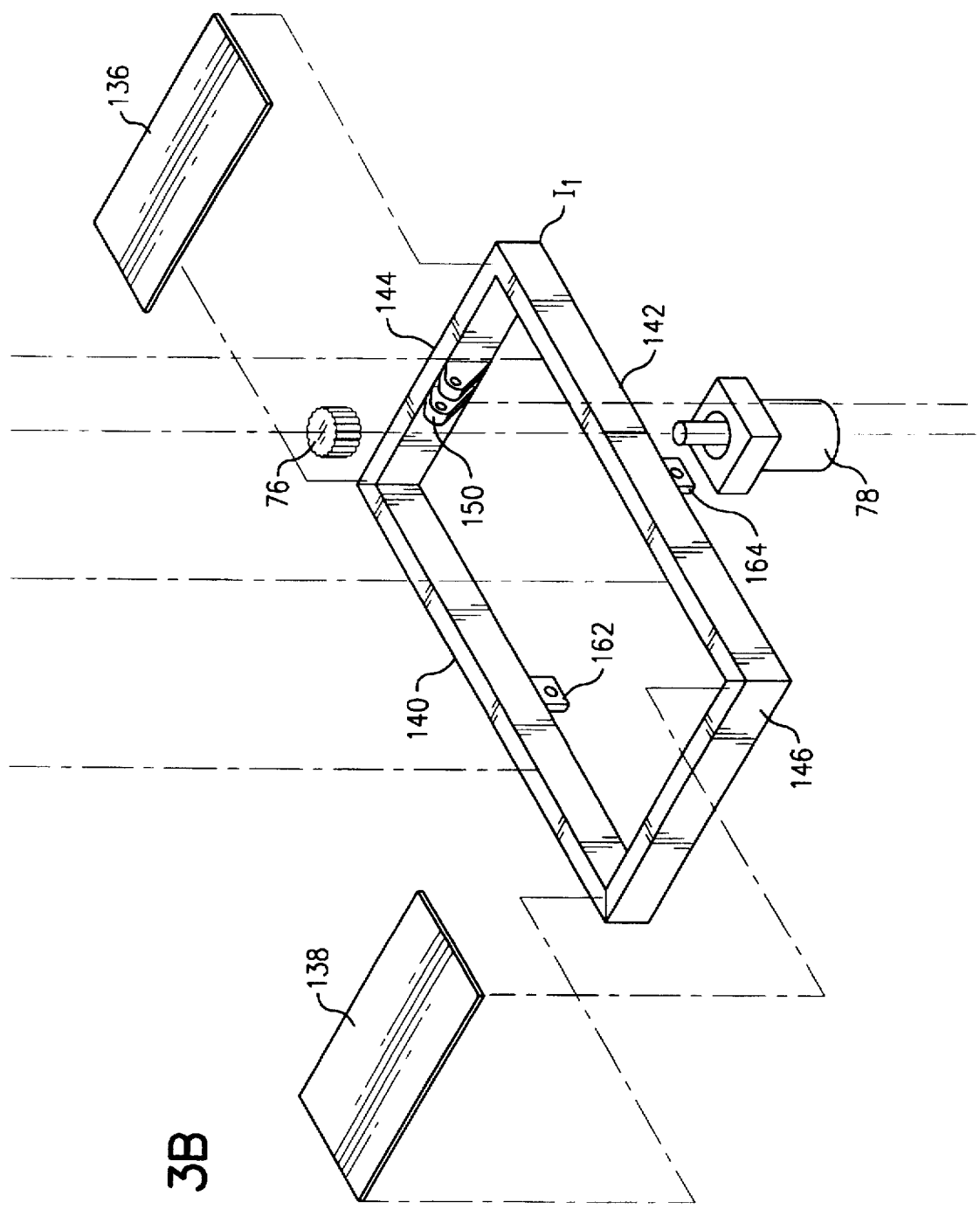
FIG. 3B shows the second frame of my novel pipe laying apparatus, located below the first frame and above the third frame, as well as the hydraulic drive motor for the rotating gear assembly.

Turning now to FIGS. 3A, 3B, 3C, and 3D, further structural details of my pipe grasping apparatus 20 will be described. In FIG. 3A, first frame $F_1$ is shown. A bottom plate 120 is provided, as well as right 122 and left side 124 longitudinal stiffeners. Also, front 126 and rear 128 transverse stiffeners are provided. Each of the bottom plate 120 and stiffeners 122, 124, 126, and 128 are provided in sufficient thickness T (see $T_{122}$ for thickness of longitudinal stiffener 122, for example) to enable a welded or otherwise assembled final frame $F_1$ to have sufficient strength to suspend therefrom the operating weight of grasping apparatus 20 and a selected pipe section, plus ample safety margin.

Figure 4:
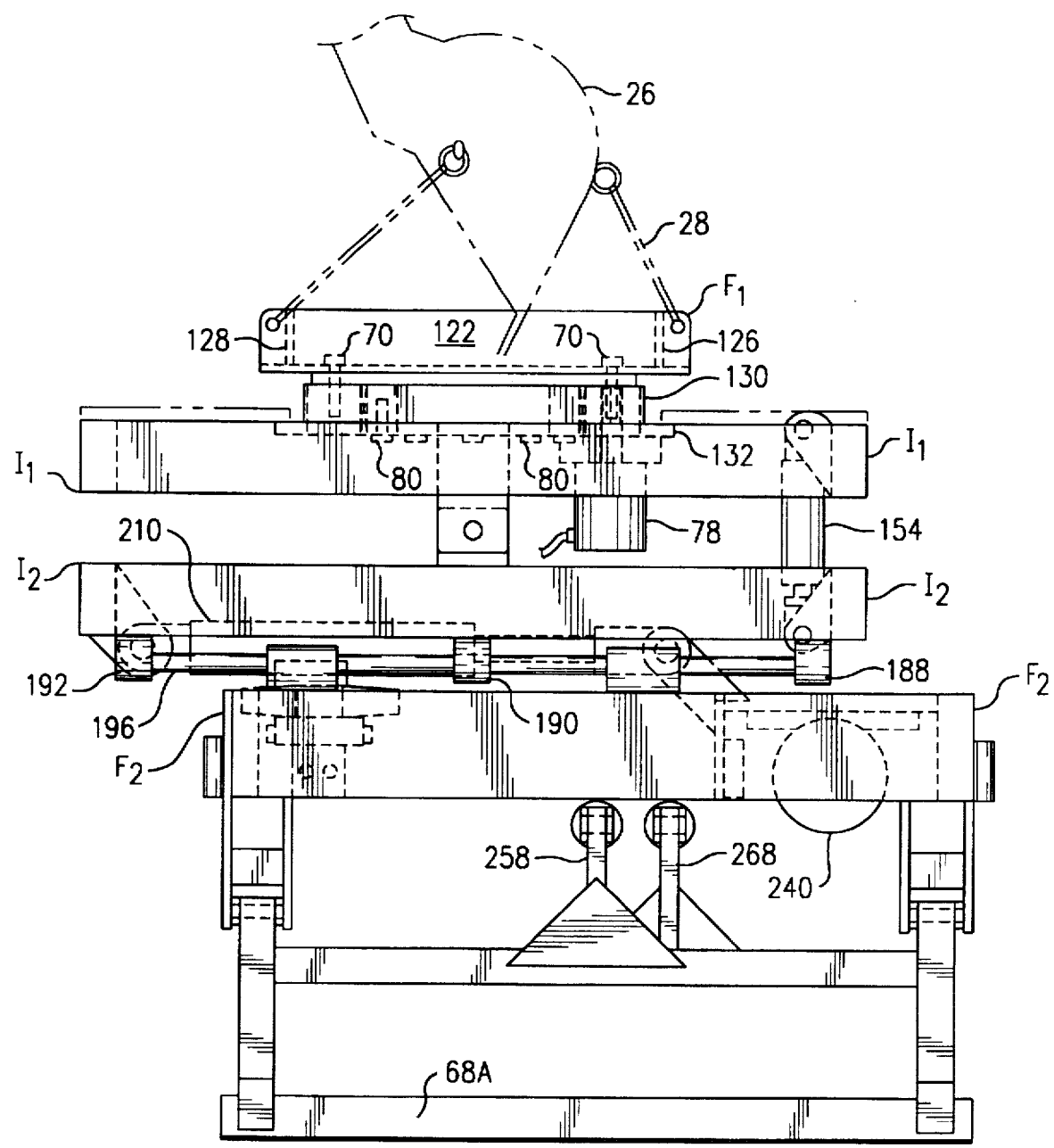
FIG. 4 illustrates how my novel pipe laying apparatus is suspended below a selected device such as a backhoe or trackhoe, for operation with respect to raising and lowering pipe.

Housing 130 is provided for gear 74 and pinion 76. Housing 130 is mounted on base plate 132, which is in turn affixed, preferably by welding, to first intermediate frame $F_1$, as may be better appreciated in FIG. 4. Returning to FIG. 3B, the first intermediate frame $F_1$ also has protective front end plate 136 and a protective rear end plate 138, useful for keeping gravel and other debris out of the device, and particularly away from actuators as further described below. Plates 136 and 138, in cooperation with base plate 132, preferably cover any apertures formed by the left 140 and right 142 longitudinal members and the front 144 and back 146 transverse members of the first intermediate frame $I_1$.

Figure 3C:
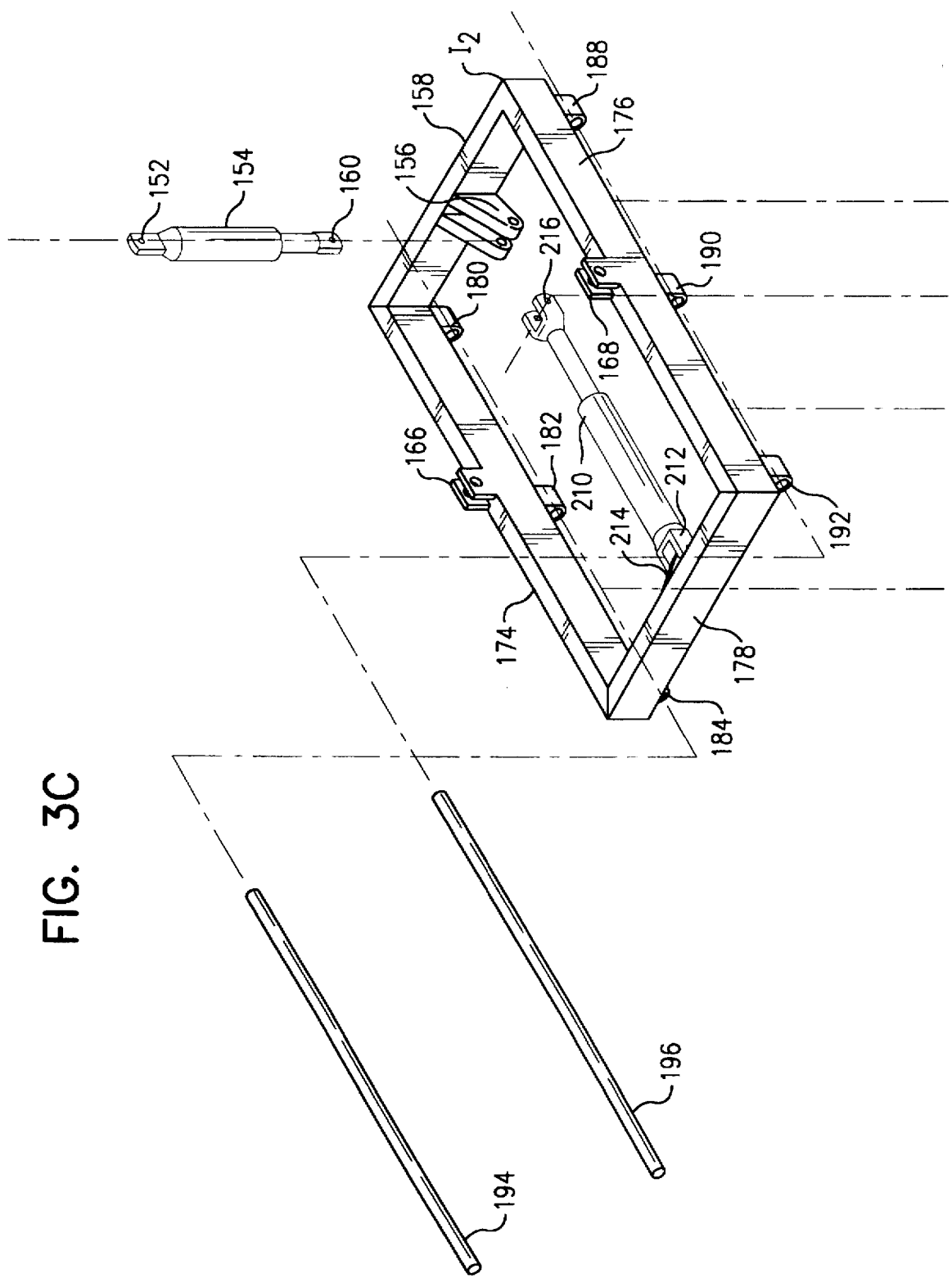
FIG. 3C shows the third frame of my novel pipe laying apparatus, located below the second frame and above the fourth frame, as well as (a) a hydraulic cylinder used to pitch the second frame with respect to the third frame, and (b) a second hydraulic cylinder used to linearly displace the third frame with respect to the fourth frame.
Figure 3D:
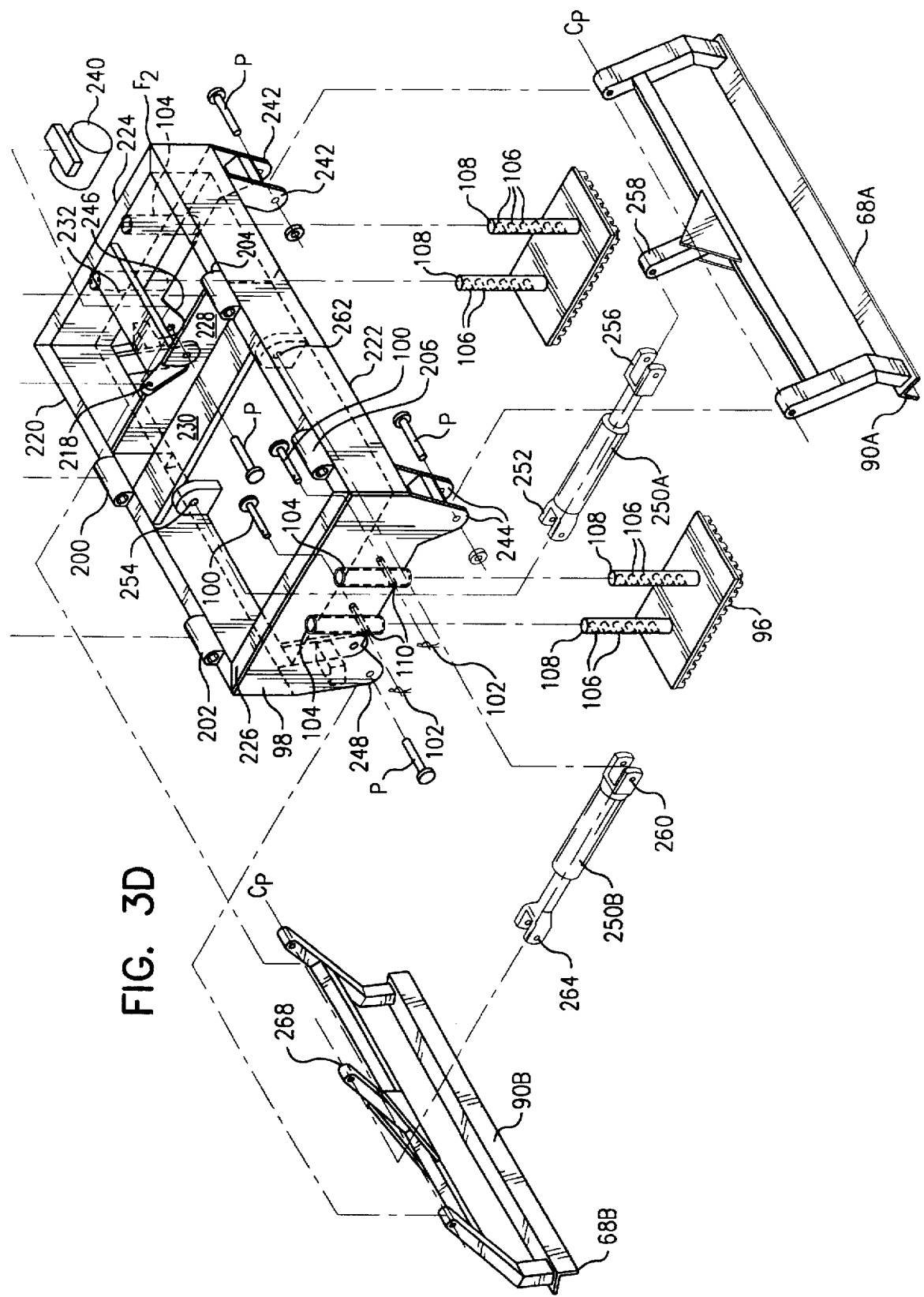
FIG. 3D shows the fourth frame of my novel pipe laying apparatus, located below the third frame, and used to suspend grappling arms therebelow for grappling elongated workpieces such as pipe sections.

An attachment point such as the pair of ears 150 extends rearwardly from the front 144 of first intermediate frame $F_1$ for pivotal attachment of a first end 152 of a pitching actuator 154, as seen in FIG. 3C. A complementary attachment point such as the pair of ears 156 on the front member 158 of second intermediate frame $I_2$ provides the means for pivotal attachment of a second end 160 of pitching actuator 154. A downwardly extending left 162 and right 164 lug on first intermediate frame $I_1$ (see FIG. 3B) cooperate with upwardly extending left 166 and right 168 lugs on second intermediate frame $I_2$ (see FIG. 3C) and pivot pins 170 and 172 (see FIG. 10) to allow pivotal motion between frames $I_1$ and $I_2$ when directed by pivot actuator 154.

Figure 7:
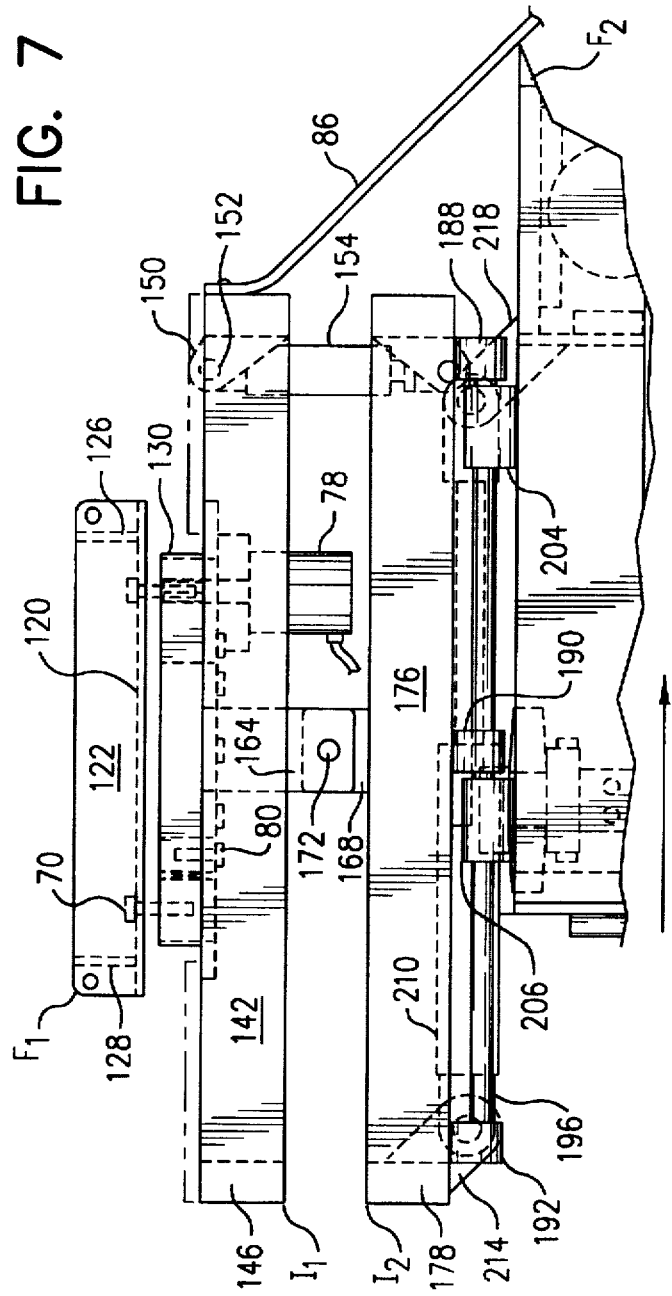
FIGS. 7 and 8 illustrate the linear movement enabled between the third and fourth frames of my pipe laying device.
Figure 8:
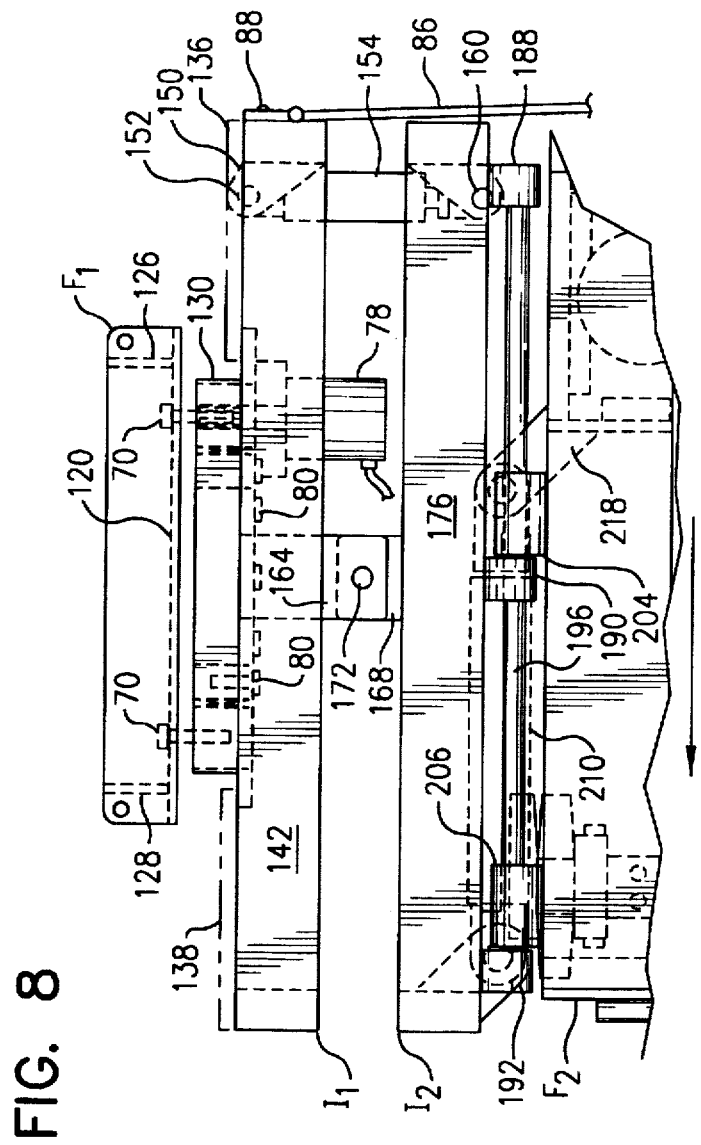

Returning now to FIG. 3C, the second intermediate frame $I_2$ is illustrated. Left 174 and right 176 longitudinal members, and front 158 and back 178 transverse members form frame $I_2$. Left side slide mount members 180, 182, and 184 accept and secure therein a generally cylindrical slide member 186. Right side slide mount members 188, 190, and 192 accept and secure therein elongate, preferably cylindrical slide members 194 and 196, respectively. Left side slide housing members 200 and 202, and right side slide housing members 204 and 206 on the second frame $F_2$ are adapted to cooperate with slide members 194 and 196 (see FIG. 3D and FIG. 4) to allow sliding displacement of frame $F_2$ with respect to frame $I_2$, as directed by slide actuator 210. Preferably, slide actuator 210 is pivotally connected to frame $I_2$, at a first end 212, at ear 214 on frame $I_2$. Slide actuator 210 is pivotally connected to frame $F_2$ at ear 218, at a second end 216. This arrangement allows linear translation along an X axis between frame $I_2$ and $F_2$, as can be appreciated by comparison of FIGS. 7 and 8.

Returning to FIG. 3D, second frame $F_2$ is shown with grapplers 68A and 68B in exploded perspective. Second frame $F_2$ has left 220 and right 222 longitudinal members, and front 224 and back 226 transverse members. A vertical transverse stiffening plate 228 and a horizontal transverse stiffening plate 230 are provided to add strength. Preferably a longitudinal stiffening plate 232, connecting front 224 and vertical transverse stiffening place 228, is used as a base from which to mount a vibrator 240.

Grappler 68A is pivotally mounted from second frame $F_2$ at downwardly extending ears 242 and 244 via pivot pins P, which provide a centerline about which grappler 68A pivots, $C_P$. Similarly, grappler 68B is pivotally mounted from second frame $F_2$ at downwardly extending ears 246 and 248 via pivot pins P, which provide a centerline about which grappler 68B pivots. Grappler 68A is actuated by grappler actuator 250A, which is pivotally mounted (a) at first end 252 at lug 254 on frame $F_2$, and (b) second end 256 at lever arm 258 on grappler 68A. Grappler 68B is actuated by grappler actuator 250B, which is pivotally mounted (a) at first end 260 at lug 262 on frame $F_2$, and (b) second end 264 at lever arm 268 on grappler 68B.

The various figures will now be used to further explain operation of my novel pipe grasping apparatus 20. As first seen in FIG. 1, an operator 42 may utilize remote control unit 40 to control the grasping apparatus 20. The remote control unit 40 has a handle 300 and a switching head 310 which contains control switches, as well as an indicating light 312. To start, power switch 314 is turned from the "off" position to the "on" position. When the unit is on, the indicating light 312 should be illuminated. To start the pipe laying process, the clamp switch 316 is moved to the "open" position where the grasping apparatus is moved, and then lowered to straddle a preselected pipe section which is desired to be moved. FIG. 10 illustrates this concept, although normally the pipe section 52' to be moved will be located above grade, rather than in a trench 50. However, my grasping apparatus 20 is equally capable of removing pipe from a trench, and in any event, the process will be well understood by those of ordinary skill in the art and to which this disclosure is addressed by use of FIG. 10 and FIG. 1, for example. In FIG. 10, in solid lines, grapplers 68A and 68B are shown in the open position, straddling pipe 52'.

Next, grapplers 68A and 68B are moved to their closed position, representationally shown in the broken lines 68A' and 68B' in FIG. 10, but with the understanding that in a fully closed position, elongate clamping surfaces 90A' and 90B' would be tightly against pipe 52'. The movement of grapplers 68A and 68B from the open to the closed position is accomplished by moving the clamp switch 216 to the closed position and maintaining it in that position until a sufficient degree of clamping force is imparted against pipe 52' so that grapplers 68A and 68B engage and securely grasp the pipe section 52'.

Figure 5:
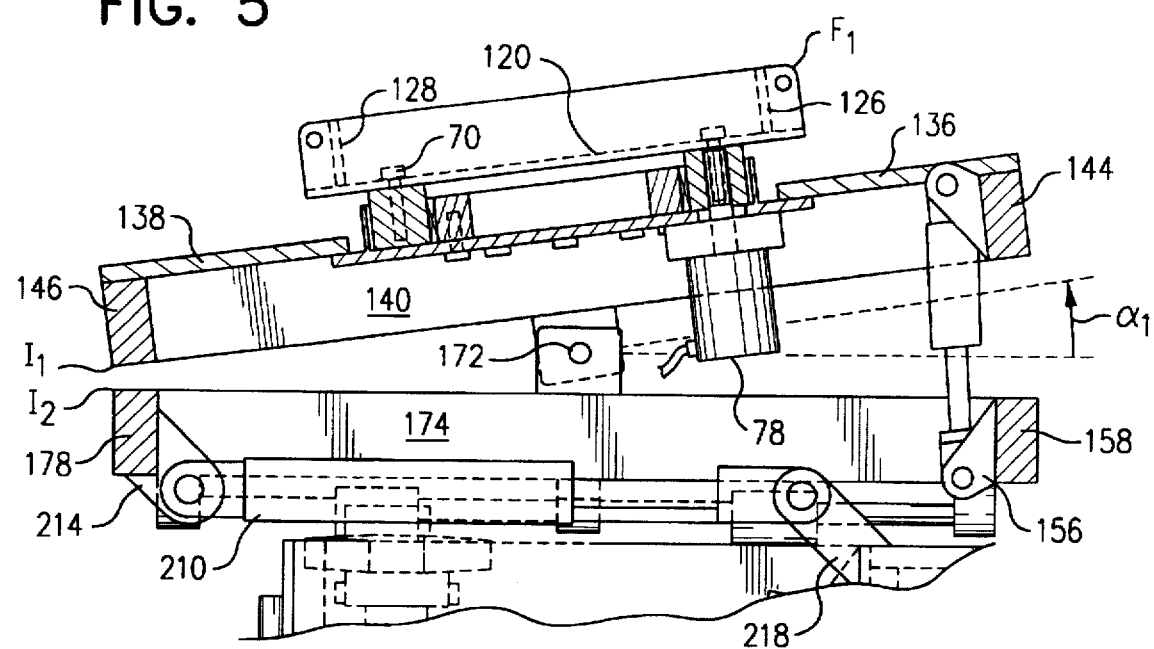
FIGS. 5 and 6 illustrate the pitch operation enabled between the second and third frames of my pipe laying device.
Figure 6:
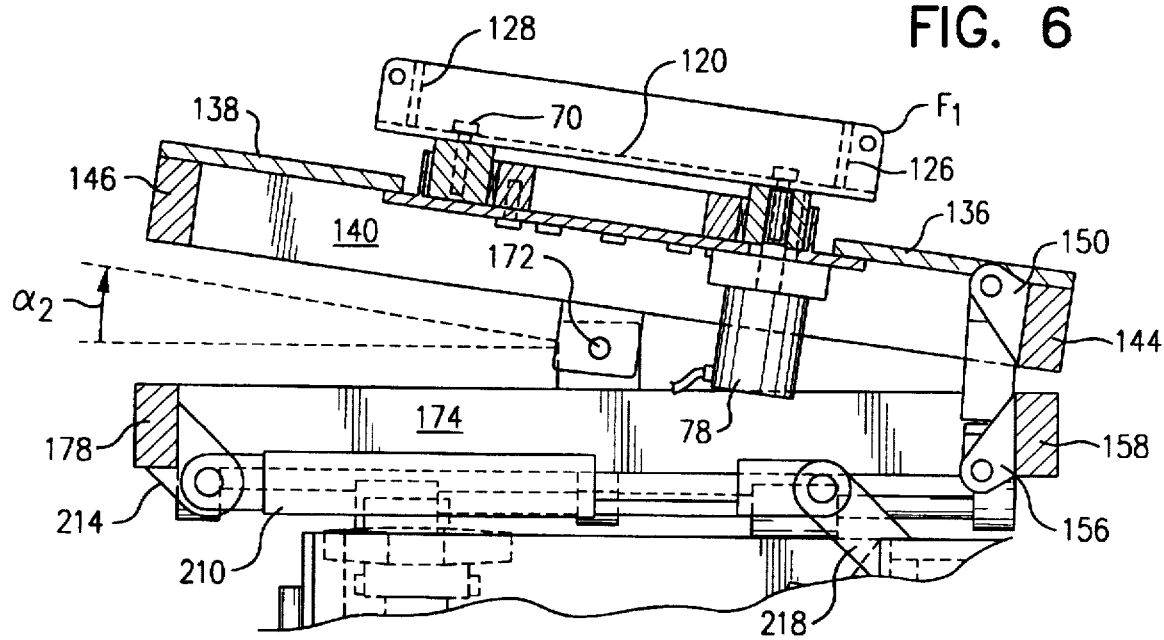

Once a pipe 52' has been securely grasped, the lifting device 22 is used to move my pipe grasping device to an selected position, such as that shown in FIG. 1. To accommodate the slope of trench 50 (i.e., the change in Z direction as a function of the X direction), the pipe section 52 as shown in FIG. 1 can be pitched (tilted), so that the pipe pitches in a desired direction, by manipulating the tilt control 320 in an "up" or "down" direction. The range of action thus provided is noted in FIGS. 5 and FIG. 6, where it can be seen that the pitch motion is achieved between the position of intermediate frames $I_1$ and $I_2$. Preferably, either the front end or the back end of grasping apparatus 20 can move up to an angle alpha$_1$ ($\alpha_1$), or alpha$_2$, ($\alpha_2$) of about 4.5 degrees from the horizontal position, with the configuration illustrated. Other somewhat different ranges of motion can easily be provided using the concept taught herein.

As depicted in FIG. 9, in order to align the a pipe section such as 52 or 52' along a pipeline run centerline (see FIG. 1, for example) the second frame $F_2$ of pipe grasping apparatus 20 can be rotated (yaw motion) in either direction from its normal X-axis centerline around a normally vertical axis Z by an angle beta ($\beta$) of approximately one hundred thirty five (135) degrees, to a location 20' or 20". This is accomplished by manipulating the rotate switch 348 in the "ccw" or counterclockwise direction, or "cw" in the clockwise direction.

Also evident in FIG. 9 is the location of hydraulic controllers 350, 352, 354, and 356 which are utilized in conventional fashion for regulating the flow of high pressure hydraulic fluid to and from the various actuators, namely pitch actuator 154, linear actuator 210, and grapple actuators 250A and 250B. Also, high pressure fluid flow is controlled to hydraulic drive 78 for pinion gear 76, and to the hydraulic motor on vibrator 240.

Next, to slide a male end 64 of a pipe section 52 into the female end 66 of a prior pipe section for sealing engagement therewith, as shown in FIG. 1, the slide switch 360 is moved to the "in" position, until sufficient distance has been traversed along the X axis, or centerline of the pipe run. To complete installation of pipe 52, gravel 370 may be dumped around pipe 52'as depicted in FIG. 10, to backfill the trench 50. Ideally, the pipe 52 prime will be secured by grasping apparatus 20 while vibrator 240 is turned on at switch 362 for energizing the hydraulic vibrator to settle gravel 370, so that the pipe section can be set securely at position 52", rather than at the uncompacted position 52', as seen in FIG. 10.

Figure 12:
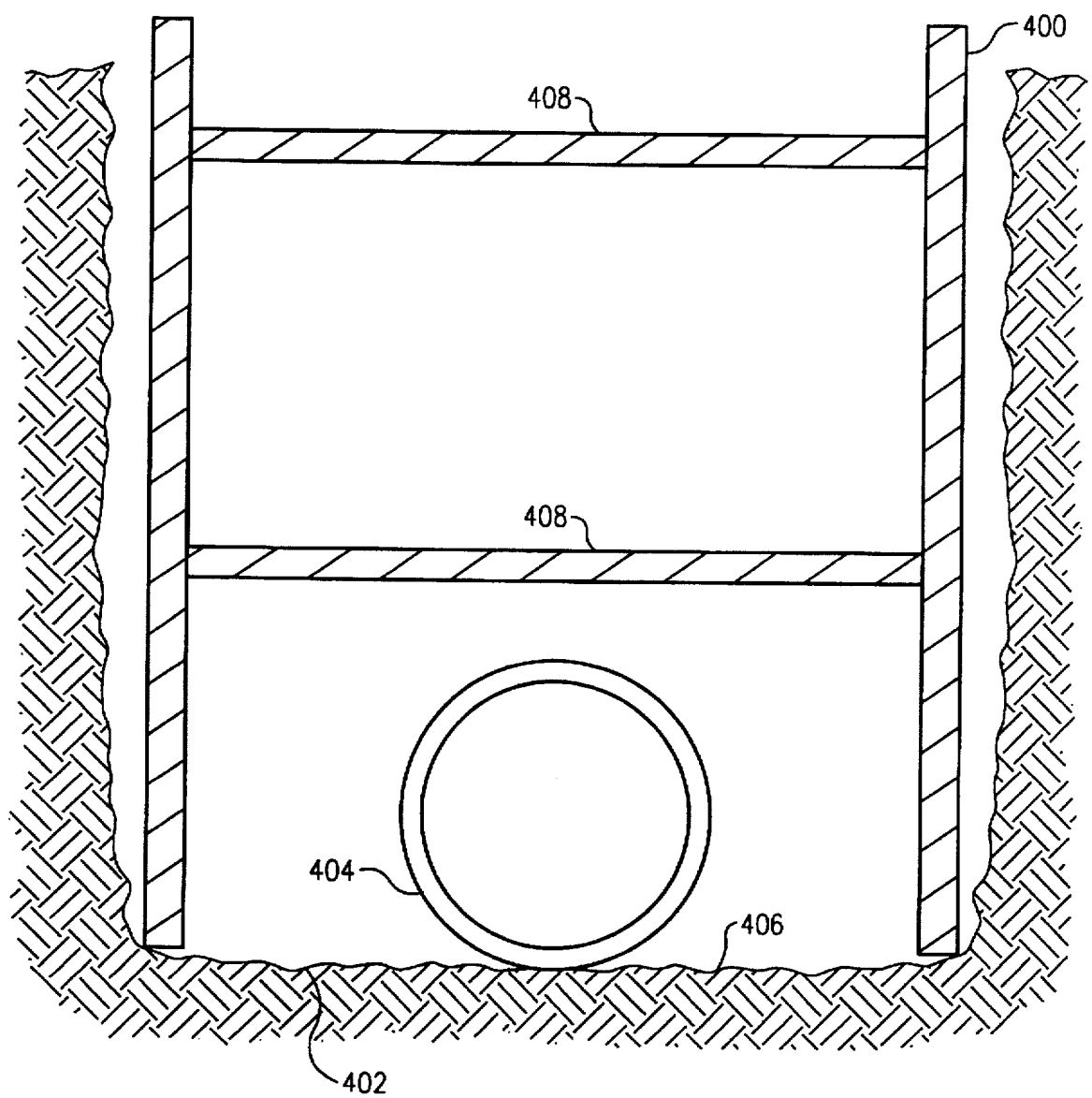
FIG. 12 illustrates the prior art use of trench boxes for sewer pipe construction.

Finally, referring first to FIG. 12, for purposes of comparison of the present invention to apparatus and methods heretofore utilized, a prior art method and apparatus commonly used for placement of pipe is shown. Specifically, a trench box apparatus 400 is provided to straddle a working zone in a trench 402. Pipe 404 is placed at the trench bottom 406, and workers are placed into the trench between the trench box walls to physically move pipe 404, or to guide the use of machinery with respect thereto. Necessary trench box cross braces 408 will usually complicate the setting of elongated objects such as pipe 404. Trench boxes are usually long and heavy devices, and those familiar with the same and to whom this specification is addressed will thus appreciate the advance provided by the present invention in allowing a piping contractor to avoid the use of such trench boxes, where ground conditions permit.

Those skilled in the art will appreciate from the foregoing description that there has herein been disclosed an exemplary pipe grasping device which permits the simple and cost effective installation of pipe sections without the necessity of personnel getting into a trench.

Of course, those skilled in the art will appreciate that various modifications can be made to the exemplary grasping device and to the pipe installation method disclosed herein without departing from the spirit and scope of the invention as described herein. It will be understood that the present invention has herein been described in connection with "relative" movement between the workpiece pipe section being installed and the pipe grasping apparatus, and that in some instances the workpiece gear may be installed vertically, and consequently, the movement of the grasping device 20 required frame of reference will have to be shifted accordingly. Also, the workpiece pipe section being installed may vary in weight, from lightweight plastic twenty (20) foot sewer pipe of about 375 pounds, to considerably heavier steel or iron pipes, by utilizing the same concept with heavier materials of construction, in which case the above described actions can by easily be conducted along workpiece sections of known length, with the same method to provide the results achieved by the approach described above.

Therefore, it will be understood that the foregoing description of representative embodiments of the invention have been presented only for purposes of illustration and description and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the structures described herein, and not only structural equivalents thereof, but also equivalent structures. Thus, the scope of the invention, as indicated by the appended claims, is intended to include variations from the embodiments provided which are nevertheless described by the broad meaning and range properly afforded to the language of the claims, or to the equivalents thereof.

What is claimed is:

1. A grasping apparatus for handling an elongated workpiece, such as a pipe section, the grasping apparatus designed to be suspended from a selected lifting device and adapted to grasp and manipulate the elongated workpiece for lifting, moving, or setting the elongated workpiece, said grasping apparatus comprising:

(a) a first frame;

(b) a second frame, said second frame displaceably secured to said first frame;

(c) a rotator, said rotator adapted to angularly rotate said second frame about a normally vertical axis of rotation with respect to said first frame;

(d) two or more grapplers, said two or more grapplers connected to said second frame in opposing juxtaposition and moveable between (i) an open position wherein said grasping apparatus is lowered to position said two or more grapplers to straddle an elongated workpiece, and (ii) a closed position wherein said two or more grapplers engage and securely grasp an elongated workpiece;

(e) a pitch actuator adapted to displace said second frame with respect to said first frame in an up or down pitching movement, and thereby move said elongated workpiece in an up or down pitching movement;

(f) a linear displacement actuator, said linear displacement actuator adapted to displace said second frame with respect to said first frame, and thereby displace an elongated workpiece in a linear direction substantially along a centerline of a linear working axis, and wherein said linear working axis is substantially along the centerline of said elongated workpiece when said workpiece is securely grasped by said two or more grapplers.

2. The apparatus as set forth in claim 1, wherein said two or more grapplers are swingingly connected to opposing sides of said second frame for movement in an inward-outward arcuate path.

3. The apparatus as set forth in claim 1, wherein each of said two or more grapplers comprise an elongate, normally horizontally running clamping surface.

4. The apparatus as set forth in claim 1, wherein said pitch actuator comprises a hydraulic cylinder.

5. The apparatus as set forth in claim 1, wherein said linear displacement actuator comprises a hydraulic cylinder.

6. The apparatus as set forth in claim 1, wherein said rotator comprises a hydaulically driven gear.

7. The apparatus as set forth in claim 1, further comprising a vibrator, said vibrator operatively connected to said second frame and adapted to generate a vibratory motion to shake said second frame and impart a vibratory motion to said two or more grapplers, and thence to said workpiece, so as to provide a vibrating motion to said elongated workpiece to thereby enable settling of a selected subtrate placed thereunder.

8. The apparatus as set forth in claim 7, wherein said vibrator comprises a hydraulically driven vibratory motor.

9. The apparatus as set forth in claim 1, wherein said two or more grapplers are displaced between said open position and said closed position by one or more hydraulic cylinders.

10. The apparatus as set forth in claim 1, wherein the selected lifting device is a piece of mobile equipment, such as a track hoe, back hoe, tractor, or crane, and wherein said grasping apparatus further comprises a connector adapted to connect said first frame to said piece of mobile equipment, so that said grasping apparatus is positioned in a preselected position for pipe section placement by moving said mobile equipment.

11. The apparatus as set forth in claim 1, further comprising a remote control unit operably interfacing with said apparatus, and wherein said apparatus is operated while connected to said mobile equipment by an operator in a selected above grade location.

12. The apparatus as set forth in claim 1, further comprising a first intermediate frame, and wherein said rotatator operatively connects said first frame and said first intermediate frame.

13. A grasping apparatus for handling a pipe section, said grasping apparatus designed to be suspended from a lifting device and adapted to grasp the pipe section for lifting, moving, or setting the pipe section, said grasping apparatus comprising:

(a) a first frame $F_1$, said first frame adapted for use in suspending said grasping apparatus from a lifting device;

(b) a first intermediate frame $I_1$, said first intermediate frame $I_1$ rotatingly suspended from said first frame $F_1$, so that said first intermediate frame $I_1$ is angularly adjustable about a normally vertical axis of rotation with respect to said first frame $F_1$;

(c) a second intermediate frame $I_2$, said second intermediate frame $I_2$ suspended from and displaceable in pitch with respect to said first intermediate frame $I_1$;

(d) a second frame $F_2$, said second frame $F_2$ suspended from said second intermediate frame $I_2$ and linearly displaceable with respect to said second intermediate frame $I_2$;

(e) grapplers, said grapplers operably attached to said second frame $F_2$ and displaceable between (i) an open position wherein said grasping apparatus is lowered to position said grapplers to straddle said pipe section, and (ii) a closed position wherein said grapplers engage and securely grasp said pipe section.

14. A hydraulically powered grappling apparatus for handling a pipe section, the grappling apparatus designed to be suspended from a lifting device and adapted to grasp the pipe section for lifting, moving, or setting the pipe section, said apparatus comprising:

(a) a first frame;

(b) a second frame, said second frame suspended from said first frame for rotating movement, so that said second frame may be adjustably angularly displaced with respect to said first frame;

(c) a third frame, said third frame suspended from and displaceable in pitch with respect to said second frame;

(d) a fourth frame, said fourth frame suspended from said third frame and linearly displaceable with respect said third frame;

(e) a set of elongated pipe grapplers, said pipe grapplers suspended from said fourth frame and laterally displaceable between (i) an open position wherein said grapplers can be be lowered to straddle a pipe section, and (ii) a closed position wherein said grapplers securely grasp said pipe section.

15. The apparatus as set forth in claim 14, wherein linear displacement between said third frame and said fourth frame is provided by one or more hydraulic cylinders.

16. A method for placing and connecting a pipe section to a pipeline portion in a below grade trench, said method comprising:

(a) grasping the exterior of said pipe section with a pipe gripping apparatus;

(b) lifting and supporting said pipe section with said pipe gripping apparatus;

(c) adjusting one or more of (i) the linear position, (ii) the pitch position, and (iii) the yaw position of said pipe section, so as to approximate the physical orientation of said pipe section to said pipeline portion;

(d) before, during, or after step (c), lowering said pipe section into said below grade trench;

(e) linearly inserting said pipe section into a connected position in said pipeline portion;

(f) disengaging said gripping apparatus from said pipe section, and (g) controlling said pipe gripping apparatus remotely therefrom and at a visual location adjacent said below grade trench, via use of a manually manipulable controller unit operatively connected to said pipe gripping apparatus.

17. The method as set forth in claim 16, wherein said pipeline portion has a settleable substrate therebelow, said method further comprising the step of vibrating said pipe section, so as to provide a vibrating motion to said pipe section, to thereby enable settling said settleable subtrate.

18. The method as set forth in claim 17, wherein the step of vibrating said pipe section is accomplished by hydraulically driving a vibratory motor to impart vibratory motion to said pipe section.

* * * * *

UNITED STATES PATENT AND TRADEMARK OFFICE
CERTIFICATE OF CORRECTION

PATENT NO. : 5,795,101　　　　　　　　　　　　　　　　　　Page 1 of 2
DATED　　　 : August 18, 1998
INVENTOR(S) : Frank N. Bill It is certified that error appears in the above-identified patent and that said Letters Patent is hereby corrected as shown below:

Title page, add the following references:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 3 | 1 | 8 | 0 | 6 | 7 | 2 | 04/65 | Bjorklund et al | | | |
| | | 3 | 2 | 0 | 7 | 3 | 2 | 6 | 09/65 | Enix, G. R. | | | |
| | | 3 | 4 | 1 | 0 | 4 | 3 | 1 | 11/68 | Vik, A. M. | | | |
| | | 3 | 4 | 2 | 6 | 9 | 2 | 9 | 02/69 | Vik, A. M. | | | |
| | | 3 | 4 | 3 | 8 | 5 | 2 | 3 | 04/69 | Vik, A. M. | | | |
| | | 3 | 8 | 3 | 4 | 5 | 6 | 6 | 09/74 | Hilfiker, W. | | | |
| | | 4 | 2 | 2 | 7 | 8 | 5 | 0 | 10/80 | Farmer et al | | | |
| | | 4 | 2 | 6 | 6 | 9 | 1 | 0 | 05/81 | Pickard, K. | | | |
| | | 4 | 2 | 6 | 8 | 2 | 1 | 7 | 05/81 | Perreault et al | | | |
| | | 4 | 5 | 1 | 5 | 5 | 2 | 2 | 05/85 | Sonerud J. | | | |
| | | 4 | 6 | 5 | 2 | 1 | 9 | 5 | 03/87 | Mc Arthur, J. | | | |
| | | | | | | | | | | | | | |

UNITED STATES PATENT AND TRADEMARK OFFICE
CERTIFICATE OF CORRECTION

PATENT NO. : 5,795,101
DATED : August 18, 1998
INVENTOR(S) : Frank N. Bill

It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 6 | 6 | 8 | 1 | 5 | 6 | 05/87 | Mason, S. | | | |
| | | R | | 3 | 2 | 5 | 3 | 2 | 10/87 | Sonerud, J. | | | |
| | | 5 | 0 | 0 | 9 | 5 | 6 | 5 | 04/91 | Esau, L. | | | |
| | | 5 | 0 | 6 | 2 | 7 | 5 | 6 | 11/91 | McArthur et al | | | |
| | | 5 | 0 | 7 | 3 | 0 | 8 | 0 | 12/91 | Blum, K. | | | |
| | | 5 | 3 | 8 | 3 | 7 | 5 | 8 | 01/95 | Patrick, W. | | | |
| | | | | | | | | | | | | | |

OTHER DOCUMENTS

| | | Crescent Pipe Tongs Brochure - date unkown |
|---|---|---|
| | | |

Signed and Sealed this

Sixteenth Day of March, 1999

Attest:

Q. TODD DICKINSON

*Attesting Officer*     *Acting Commissioner of Patents and Trademarks*